Sept. 15, 1959 TUNG C. CHEN 2,904,727
MAGNETIC CORE DRIVEN DEVICE
Filed May 16, 1956
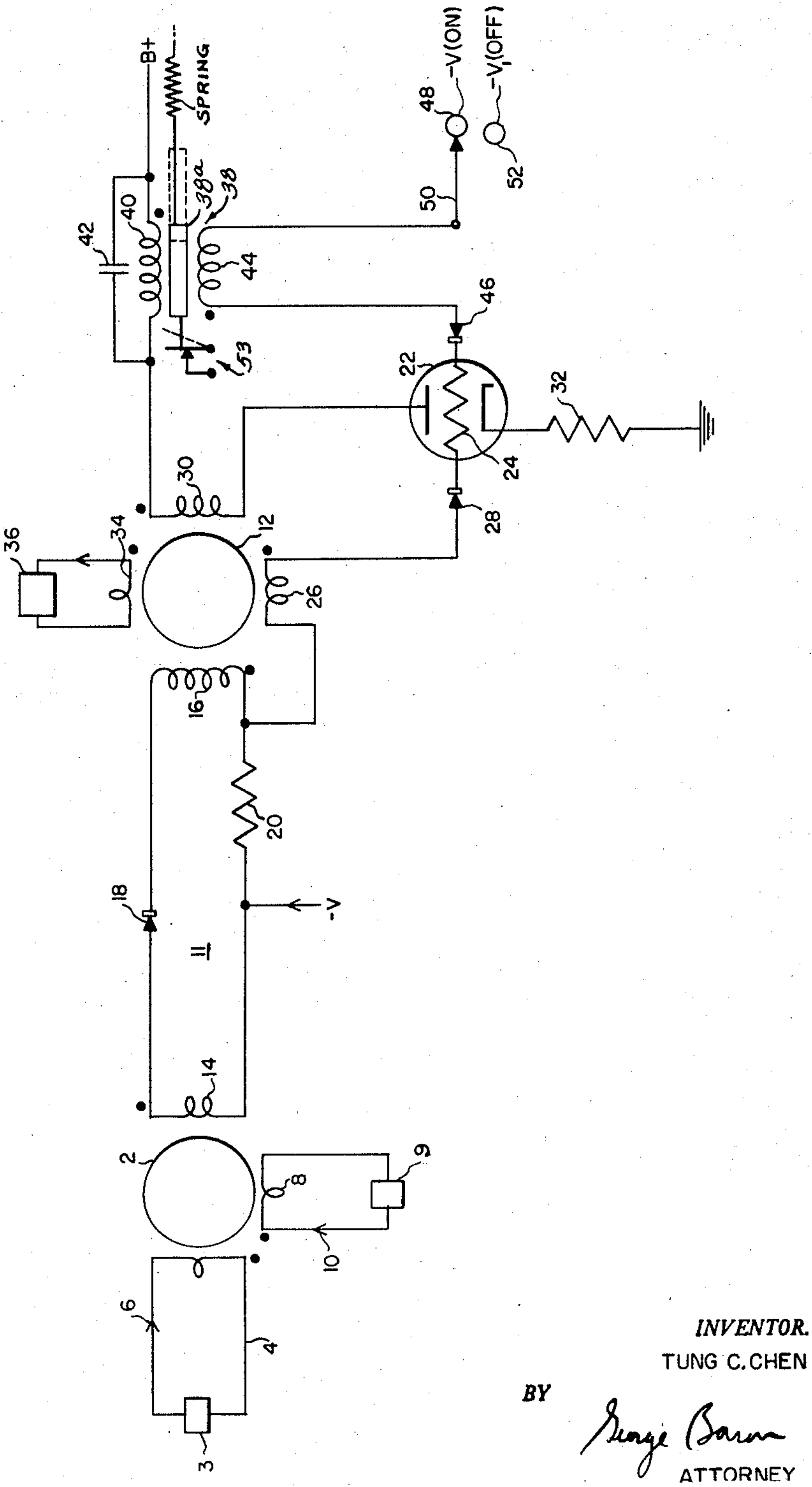
*INVENTOR.*
TUNG C. CHEN
*BY* George Baron
ATTORNEY 2,904,727
Patented Sept. 15, 1959

2,904,727

MAGNETIC CORE DRIVEN DEVICE

Tung C. Chen, Havertown, Pa., assignor to Burroughs Corporation, Detroit, Mich., a corporation of Michigan Application May 16, 1956, Serial No. 585,363

8 Claims. (Cl. 317—148)

This invention relates to magnetic cores and more particularly to a novel circuit for utilizing the output of a magnetic core to operate or control a relay.

It is well known, as evidenced by the Patent No. 2,673,337 to R. W. Avery, that bistable magnetic elements, in the shape of rods, toroidal cores or the like, can be employed for statically storing binary information. Binary electrical signals are converted to a saturating magnetic flux source, said magnetic flux source being retained in a static magnetic element either as a negative remanent state or as a positive remanent state of such element. Output signals are derived from a core by establishing a read-out (magneto-motive force) therein of a polarity tending to establish a given remanent magnetic condition. When the core is in the same magnetic remanent condition as that tended to be established by the read-out (M.M.F.) very little change of flux is presented and little output voltage is induced in an output winding associated with such core. Conversely, when the state of remanent flux is reversed, a high change of flux occurs during the application of read-out (M.M.F.) to such core and a large output voltage is induced in an output winding associated with the core. The sensing of such large output pulse gives an indication of the remanent state of the core just prior to its being read-out or interrogated. Such large output pulse occurs when the core switches from one stable remanent state to its opposite stable remanent state.

The bistable magnetic element will normally switch from one bistable state to its other bistable state in a matter of microseconds. It is often desirable to utilize the output of a switched bistable or multistable magnetic element to actuate a relay or similar slow switching device. Such need arises when a high-speed computer, employing bistable or multistable magnetic elements, is used in conjunction with a mechanical computer or a mechanically-driven adjunct of said high speed computer. It would be very desirable to utilize the output pulse obtained as a result of a switched magnetic core as the means for directly actuating a slow switching device such as, though not necessarily limited to, a solenoid actuable relay. Since the speed of switching of a magnetic core is of the order of microseconds and the speed of switching of a relay is of the order of milliseconds, one must rely on a pulse stretching circuit which will increase the pulse duration of the output pulse obtained in the output circuit associated with the switched core by a factor of 1000, or within the range of 500–1000. There is no practical circuit to carry out such pulse stretching. Moreover the energy in the output pulse of a switched core is so low that it cannot be employed generally to actuate a solenoid or similar electromagnetic relay.

Consequently, it is an object of this invention to provide an improved magnetic circuit utilizing switching elements whose speeds of operation differ considerably from one another.

Another object of this invention is to provide a system for utilizing the output of a relatively fast-switching magnetic core to directly operate a relatively slow switching solenoid, relay or similar device.

It is yet another object of this invention to provide a practicable means for employing the low energy, short duration pulse obtained in the output circuit of a switched core to actuate a switching device that normally requires high energy, long pulse duration for its operation.

A complete understanding of this invention and the manner in which the aforementioned objects may be attained may be gained from consideration of the following description and accompanying drawing in which:

The sole figure of the drawing shows an example of an embodiment of the invention in electrical schematic form.

There is shown in the drawing a circle representing a ferromagnetic core 2 having a substantially rectangular hysteresis loop characteristic and composed, for example, of a ferromagnetic substance, which may be a nickel-iron alloy. The ferromagnetic material is further identified by those skilled in the art, as 4–79 molybdenum Permalloy, supermalloy, etc. and is called "Deltamax" by Allegheny Ludlum Steel Company, a manufacturer of such ferromagnetic cores. Core 2 will be assumed to have two stable states of magnetic remanence. Current from any suitable source 3 entering the input winding 4 associated with core 2 in the direction of arrow 6 will tend to switch core 2 to its positive remanent state. Current from a suitable source 9 of electrical pulses entering the winding 8 associated with core 2 in the direction of arrow 10 will tend to switch core 2 to its negative remanent state. A transfer loop 11 magnetically couples core 2 to core 12, the latter being similar in size and characteristics to that of core 2, although it is permissible to employ a core 12 whose physical dimensions differ from those of core 2.

Output winding 14 is coupled to core 2 and input winding 16 is coupled to core 12. A diode 18 and resistor 20 complete the transfer loop 11. Winding 14 has fewer turns than winding 16 so as to enable core 12 to act as a multistable rather than as a bistable core. Winding 14 is so oriented with respect to core 12 that current flow through said winding 14 is in the forward direction of diode 18 only when core 2 is switched from its positive remanent state to its negative remanent state. The induced current flow through the transfer loop 11 causes core 12 to switch towards its positive remanent state, but because of the turns ratio between windings 14 and 16, core 12 will be stepped a discrete interval along its hysteresis loop, remaining, when induced current no longer flows through the transfer loop 11, at some magnetic remanent position between its lowermost magnetic remanent state and its highermost magnetic remanent state.

Repeated switchings of core 2, which will be called the quantizing core, from its positive remanent state to its negative remanent state, will cause core 12, called the count core, to climb its B—H hysteresis loop until its highermost remanent condition is reached. If it has taken $n$ switchings of bistable quantizing core 2 from its positive remanent state to its negative remanent state to step count core 12 by discrete intervals to its last remanent condition, then count core 12 has served to retain, by virtue of its magnetic state, $n$ switchings or $n$ counts of quantizing core 2.

When quantizing core 2 switches for the $(n+1)$ st time from its positive remanent state to its negative remanent state, the induced current flow in the forward direction through diode 18 will find winding 16 to be a low impedance element in its path because of the state of count core 12 (the core having a substantially rectangular B—H hysteresis loop cannot be stepped any higher along its B—H curve) so that such induced current flow through diode 18 and winding 16 will create a relatively high potential drop across resistor 20. It is seen from the drawing that triode 22 is biased to cut-off by a negative potential —V that is applied to the grid 24 of tube 22 through resistor 20, compensating winding 26, and the high back resistance of diode 28. Compensating winding 26 is relied upon to prevent premature firing of tube 22 during the stepping process of core 12. As core 12 is being stepped upward in discrete intervals along its B—H hysteresis loop, a certain amount of current does in fact flow through resistor 20. Such flow might cause a slight positive potential to appear at the grid 24 of tube 22. To prevent such positive potential from triggering tube 22, compensating winding 26 is placed in series with resistor 20 and diode 28. When core 12 is being stepped in discrete intervals, a potential is induced in compensating winding 26 that opposes the potential that appears across resistor 20. Consequently by proper choice of the number of turns for winding 26, the voltage developed across resistor 20 during the step-switching of count core 12 is offset by the voltage induced in compensating winding 26. When count core 12 has reached its last positive remanent state, no compensating voltage is induced in winding 26 so that the voltage produced across resistor 20 is desirably unopposed by any bucking voltage from compensating winding 26.

The potential drop across resistor 20, if high enough, is in the direction to remove the cut-off negative bias —V on grid 24 of tube 22 so that the latter is made to conduct. Conduction of tube 22 will draw current from a conventional B+ power supply through the dotted terminal of winding 30, through tube 22, through optional resistor 32, and then to ground. Such current flow will reset count core 12 to its lowermost magnetic remanent state, and such resetting of count core 12 to its lowermost magnetic remanent state will induce a potential in winding 16 that will oppose and override the normal negative bias —V on grid 24 and thus enhance the conduction of tube 22. The potential induced in winding 16 during reset of core 12 will drive current through resistor 20, winding 12 and diode 18 and will tend to reset core 2. This, however, is not objectionable since, in the counting circuit shown and described, the core 2 will next be driven to the set state by the next pulse from source 3. Compensating winding 26, being wound in the same direction as winding 16, also serves to enhance the conduction of tube 22. However winding 16 provides the main portion of the regenerative signal. Consequently, regenerative action takes place between winding 30 and winding 16 to assure conduction of tube 22 until count core 12 has been completely reset. If desired, an output winding 34 may be employed to carry an output signal to a suitable recording device 36 for indicating or registering each reset of count core 12.

The above described actuation of a multistable core, such as count core 12, by a quantized unit of flux energy associated with the switching of a binary magnetic core, and the consequent resetting of such count core, is not the invention of the present applicant. Such invention is described and claimed in a copending application for a "Magnetic Device," by T. C. Chen and R. A. Tracy, Serial No. 498,257, which was filed in the the U.S. Patent Office on March 31, 1955 and is assigned to the same assignee as is the present application. The aforedescribed subject matter serves as a typical, though not a limiting, magnetic circuit to which the instant invention may be advantageously applied.

The relatively slow switching device is shown schematically in the drawing as a solenoid 38 having an armature 38*a* and a winding 40 magnetically linked to such armature 38*a*. When sufficient current flows through the winding 40, the magnetic field created by current flow through winding 40 will be such as to cause armature 38*a* to move away from its normally spring-biased position, such motion being effective, in accordance with some previous arrangement, to either make or break an electrical contact, as at contact 53. In parallel with winding 40 is condenser 42. Regeneratively coupled to winding 40 is another winding 44, having one terminal connected to the grid 24 of tube 22 via diode 46 whereas its other terminal is connected to contact 48 by means of switch arm 50, such contact 48 being maintained at a negative potential —V which is the same negative potential applied to the grid 24 through resistor 20, compensating winding 26, and diode 28. Switch arm 50, which may be either manually or automatically operated, makes electrical contact with contact 48 whenever it is desired to operate solenoid 38.

Assume that multistable count core 12 has reached its nth or last remanent state and quantizing core 2 switches for the $(n+1)$st time. As was explained above, the induced current that flows through the transfer loop 11 as a consequence of the switching of core 2 from its positive remanent state to its negative remanent state will find winding 16 to be a low impedance element because of the state of count core 12. The increased potential drop across resistor 20 will remove the cut-off bias of tube 22, causing the latter to become conducting. Conduction of tube 22 will draw current from the B+ power supply through winding 40. However the time normally required to reset core 12 is of the order of microseconds, whereas the solenoid winding 40 having many more turns than any one of the core windings 16, 26, 30 or 34 will impede the flow of current for milliseconds. To permit rapid resetting of the core 12, a by-pass condenser 42 is employed parallel to winding 40 to provide a path for the surge of current from the B+ supply that will reset core 12 to its negative remanent state. The resetting of count core 12 causes a regenerative coaction to take place between windings 16 and 30 so as to enhance the conduction of tube 22.

After core 12 has been reset, the tube 22 remains conductive (for a reason about to be described) and current from the B+ supply continues to flow through winding 40. With respect now to the reason why tube 22 remains conductive after core 12 has been reset, it will be seen that as current through the dotted terminal of winding 40 increases, in accordance with Lenz's law, a voltage is induced in winding 44 which is positive at the dotted terminal of winding 44. Such induced voltage in winding 44 is, therefore, in the sense that opposes the negative bias —V that is applied to grid 24 via switch arm 50, winding 44, and diode 46 and is of such magnitude as to render the tube conducting. This regenerative action between winding 40 and winding 44 continues until current through the winding 40 builds up to its maximum.

Sometime between initial current flow through winding 40 until maximum current flow through winding 40 is reached, the solenoid 38 will have switched from an initial state to another desired state. Since a core such as the core 12 will have switched in a matter of microseconds, the regenerative coaction of windings 26 and 30 no longer is effective in overcoming the negative bias —V on grid 24 to keep tube 22 conducting. However due to the much slower switching time of solenoid 38, the regenerative coaction between windings 40 and 44 persists after the regenerative coaction between windings 16 and 26 and winding 30 has stopped so as to assure conduction of tube 22 until solenoid 38 has been completely actuated. If solenoid 38 is spring-biased to oppose the effect of the magnetic flux created by winding 40 when current is flowing therethrough, armature 38*a* will return to its initial position when tube 22 stops conducting.

The contact 52 is connected to a negative bias $-V_1$ which supplies a cut-off bias to grid 24 when switch arm 50 is turned to make electrical contact with contact 52, such cut-off bias being high enough so that the tube 22 is never fired when the switch arm 50 makes contact with contact 52. Thus, when it is desired not to actuate solenoid 38 upon the resetting of count core 12 from its positive remanent state to its negative remanent state by reset means not shown, switch arm 50 is turned to the Off condition, and tube 22 remains non-conductive during such reset of count core 12.

It is to be understood that although the invention was illustrated in an embodiment employing relatively fast switching bistable and multistable magnetic elements as the means for actuating relatively slow switching devices such as relays, solenoids, or the like, the invention in its broader aspects embraces the simultaneous actuation of a relatively fast switching element by the same source of switching energy without interfering with the desired speeds of switching of such different elements. If desired, the amplifier 22 could be replaced with a transistor or similar suitable equivalent amplifying device.

An exemplary though nowise limiting set of operating data would call for a B+ value of 150 volts, a capacitance of .01 $\mu$ farads for condenser 42, 300 turns for winding 16, 50–100 turns for compensating winding 26, 6500 turns for winding 40, and 2500 turns for winding 44. The negative bias $-V$ is $-10$ volts and the negative bias $-V_1$ is $-35$ volts.

What is claimed is:

1. A magnetic element having at least two stable states of magnetic remanence and whose switching time from an initial stable state to some other stable state is of the order of microseconds, a solenoid having an armature, said armature having an initial position and an end position and whose movement time from said initial position to said end position is of the order of milliseconds or greater, a first winding associated with said solenoid and adapted, when carrying current therethrough, to move said solenoid armature from its initial position to its end position, a reset winding connected in series with said first winding and adapted, when carrying current therethrough, to reset said magnetic element to its initial stable state, an amplifying device including an anode, cathode and a grid, said reset winding being also connected to said anode, bias means coupled to said grid for rendering said amplifying device non-conductive, first regenerative circuit means associated with said reset winding and coupled to said grid, second regenerative circuit means associated with said first winding and coupled to said grid, and means for overcoming said grid bias to render said amplifying device conducting, whereby said magnetic element will be reset to its initial position and said solenoid armature will be moved toward its end position and said first and second regenerative circuit means will be operative to apply voltage in opposition to said bias on said amplifying device and maintain said tube conducting until complete reset of said magnetic element and complete movement of said solenoid armature from its initial position to its end position have taken place.

2. A circuit for switching two magnetic elements, a first element having at least two stable states of magnetic remanence and whose switching time from an initial stable state to another stable state is of the order of microseconds or less, a second magnetic element capable of being moved from a given position to an end position, the movement time of said second magnetic element being of the order of milliseconds or more, an amplifier device comprising an anode, grid and cathode, a source of electrical energy applied to the anode and cathode of said tube, a first winding adapted to move said second magnetic element to its end position and connected in series with said amplifier device, a capacitor in parallel with said first winding, first regenerative circuit means associated with said first winding, a second winding coupled to said first element for resetting said first element to its initial stable state, second regenerative circuit means associated with said second winding, both regenerative circuit means being in series with said grid, means for applying negative bias to said grid through said regenerative circuit means so as to render such amplifying device non-conductive, and further means for overcoming said negative bias so as to render said tube conducting, whereby said first element is switched and said second regenerative circuit means is made operative to assure the continued conduction of said amplifying device until said first element has completely switched and said first winding is energized and said first regenerative circuit means is made operative to assure continued conduction of said amplifying device until said second element has completed its movement to said end position.

3. An electrical circuit comprising a binary magnetic element having a substantially square hysteresis loop and two stable states of magnetic remanence, a second magnetic element also having a substantially square hysteresis loop and capable of assuming a plurality of $n$ successive discrete stable states, a transfer loop coupling said two elements and adapted to apply magnetic flux energy through said loop to said second element so as to switch said second element to its next successive stable state when said first element switches from a predetermined stable state to its other stable state, means for resetting said second magnetic element to its first stable state after said second magnetic element has reached its $n$th stable state and including a reset winding coupled to said second magnetic element, an amplifying device comprising an anode, a grid and a cathode, said reset winding being connected to said anode, a resistive element in said transfer loop, a second winding associated with said second magnetic element and regeneratively coupled to said reset winding, said resistive element, second winding and grid being serially connected, means for biasing said grid beyond cut-off potential of said amplifying device through said resistive element, a solenoid having an armature and a third winding in series with said reset winding and magnetically linked to said solenoid armature, a capacitor in parallel with said third winding, a fourth winding regeneratively coupled to said third winding and coupled to said grid, and means for biasing said amplifying device beyond cut-off through said fourth winding, whereby the creation of a predetermined positive potential drop across said resistive element will trigger said amplifying device to conduction so as to begin the regenerative switching of said second magnetic element and actuation of said solenoid armature.

4. A multistable magnetic element having at least two stable states of magnetic remanence including an initial remanent state, means for applying energy to said magnetic element so as to switch said element from its initial remanent state to some other remanent state, the switching time of said magnetic element being of the order of microseconds or less, a solenoid having a first winding and an armature capable of movement from an initial position to an end position, the movement time of said solenoid from its initial position to its end position being of the order of milliseconds or more, an amplifying circuit including an amplifying device having an anode, cathode, and grid, a second winding coupled to said magnetic element and adapted to reset said magnetic element to its initial remanent state, said first and second windings forming a series circuit with said anode, a condenser in parallel with said first winding, a source of electrical energy applied between said anode and cathode, first regenerative circuit means associated with said first winding and second regenerative circuit means associated with said second winding, means for applying negative bias to said grid through said regenerative circuit means, and means for triggering said amplifying device into conductivity whereby current is drawn from said source of electrical energy to pass through said condenser and said second winding to switch said magnetic element to its initial state, such switching actuating said second regenerative circuit means so as to keep said amplifying device conducting until complete switching of said magnetic element to its initial state has taken place, said same current flowing through said first winding to energize said solenoid and said first regenerative circuits means so as to keep said amplifying device conducting until said solenoid armature has completed movement to its end position.

5. In combination; a relay having a first winding, said relay being capable of being operated in a time period $t_1$; a magnetic core having a plurality of stable states of magnetic remanence one of which is a reset state, said core being capable of being switched to the reset state from the remanence state most remote therefrom in a time period $t_2$, said time period $t_2$ being substantially shorter than said time period $t_1$; a reset winding on said core; and means for utilizing said core to control the operation of said relay, said last-mentioned means comprising: an amplifier having input and output electrodes; voltage means connected to said input electrodes for normally biasing said amplifier into non-conduction; driving means for driving said core to the remanence state most remote from said reset state; resistance means included in said driving means and across which a voltage of substantial magnitude is developed when said core reaches said most remote state of remanence; means for applying said developed voltage to said input electrodes to override said bias, thereby to cause conduction of said amplifier; means for serially connecting said reset winding of said core and said first winding of said relay in the output circuit of said amplifier, thereby to reset said core in response to the conduction of said amplifier; a second winding on said relay so coupled to said first winding that in response to the flow of said amplifier current through said first winding a voltage is induced in said second winding, and means for applying said induced voltage to the input electrodes of said amplifier to override said bias, thereby to assure conduction of said amplifier for a period at least as long as that required to operate said relay.

6. In combination; a current-operated device capable of being operated in a time period $t_1$; a magnetic core having at least two stable states of magnetic remanence one of which is a reset state, said core being capable of being switched to said reset state from a remanent state most remote therefrom in a time period $t_2$, said time period $t_2$ being substantially shorter than said time period $t_1$; driver means for driving said core to said most remote state of remanence; and means for utilizing said core to control the operation of said current-operated device, said last-mentioned means comprising: an amplifier having a current-control electrode; means normally biasing said amplifier into non-conduction; resistance means included in said driver means across which a substantial voltage is developed when said core reaches said most remote state of remanence; means for connecting said resistance means to said current-control electrode to apply thereto a voltage to override said bias, thereby to cause conduction of said amplifier; first and second mutually coupled windings associated with said current-operated device; a reset winding on said core; means for connecting said reset winding and said first winding of said device in series in the current path of said amplifier, thereby to effect reset of said core in response to the flow of amplifier current through said reset winding, and thereby, in response to the flow of amplifier current through said first winding of said device, to induce a voltage in the said second winding; and means for applying said induced voltage to the current-control electrode of said amplifier to override said bias, thereby as assure continued conduction of said amplifier for a period at least as long as that required to complete operation of said current-operated device.

7. In combination; a current-operated device capable of being operated in a time period $t_1$; a magnetic core having at least two stable states of magnetic remanence including two extreme states of remanence of opposing polarity and capable of being switched from one extreme state to the other in a time period $t_2$, said time period $t_2$ being short relative to that of time period $t_1$; and means for utilizing said core to cause operation of said device, said last-named means comprising: an amplifier having a current-control element; means normally biasing off said amplifier to prevent current flow therethrough; means for driving said core to one of said extreme states of remanence; means responsive to the arrival of said core at said one extreme state of remanence for developing a voltage; means for applying said developed voltage to said current-control element of said amplifier to oppose and override said bias, thereby to turn on said amplifier; means associated with said core and connected in the current path of said amplifier for switching said core to the other of said extreme states of remanence; current carrying means associated with said current-operated device and connected in the current path of said amplifier for inducing a voltage in response to the turning on of said amplifier; and means for applying said induced voltage to the control element of said amplifier to oppose and override said bias, thereby to maintain current conduction through said amplifier for a time period at least as long as $t_1$, whereby operation of said current-operated device is assured.

8. In combination; a current-operated device capable of being operated in a time period $t_1$; a magnetic core having at least two stable states of magnetic remanence including two extreme states of remanence of opposing polarity and capable of being switched from one extreme state to the other in a time period $t_2$, said time period $t_2$ being short relative to that of time period $t_1$; and means for utilizing said core to cause operation of said device, said last-named means comprising; an amplifier having a current-control element; means normally biasing off said amplifier to prevent current flow therethrough; means connected to said current-control element of said amplifier and responsive to the magnetic condition of said core for developing a voltage for overriding said bias and turning on said amplifier; first and second windings associated with said current-operated device; means connecting said first winding in the current path of said amplifier for inducing a voltage in said second winding in response to the turning on of said amplifier; and means for applying said induced voltage to the current-control element of said amplifier to override said bias, thereby to assure continued current conduction through said amplifier for a time period at least as long as $t_1$, whereby operation of said current-operated device is effected.

References Cited in the file of this patent

UNITED STATES PATENTS 2,777,098 Duffing et al. ___________ Jan. 8, 1957